Feb. 21, 1967  G. W. DARDIS  3,304,642
LICENSE HOLDING DEVICE
Filed Oct. 28, 1963
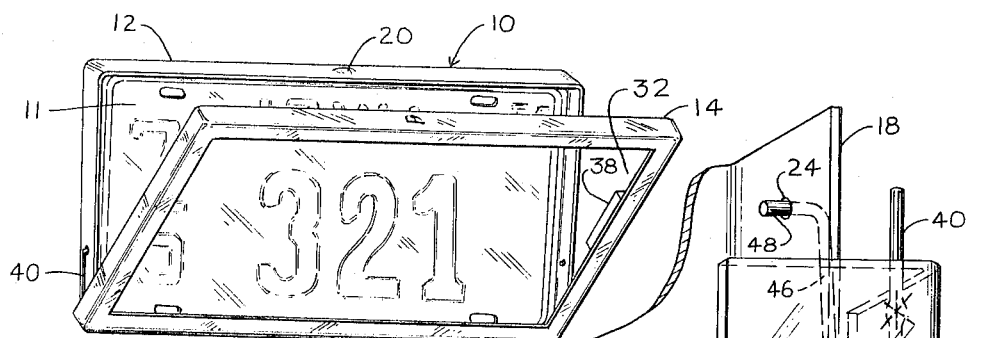
Fig. 1
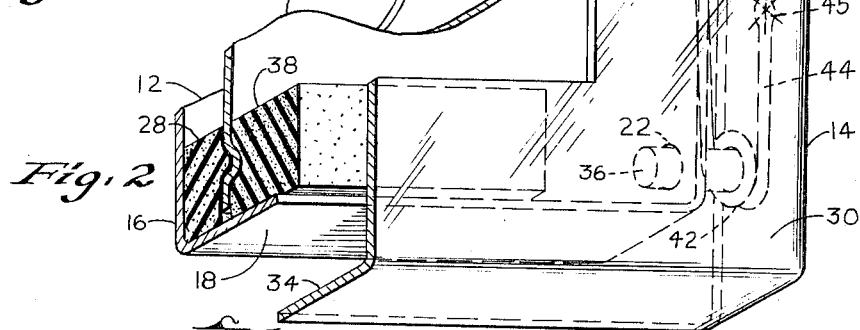
Fig. 2
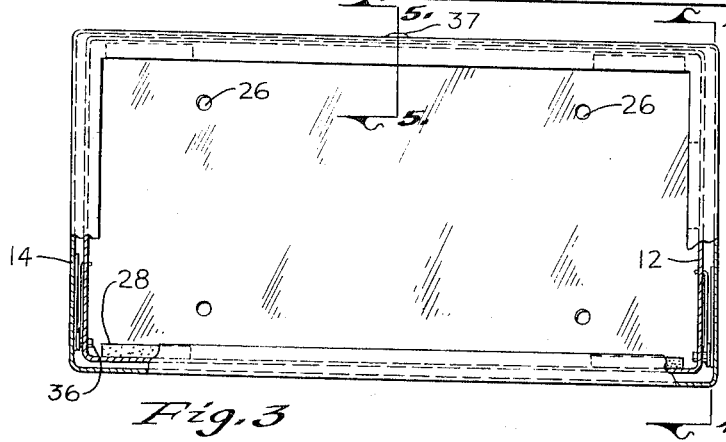
Fig. 3
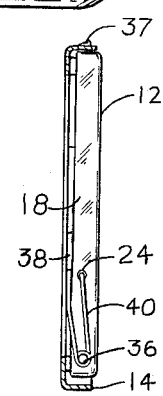
Fig. 4
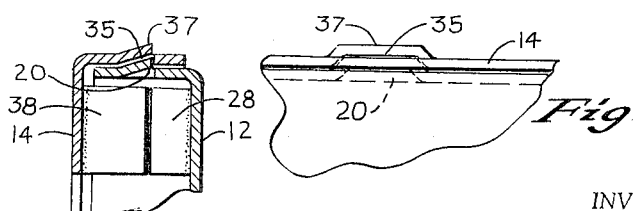
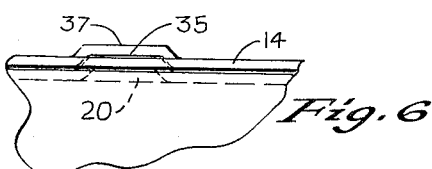
Fig. 6
Fig. 5
INVENTOR.
GILBERT W. DARDIS
BY
Dick & Zarley
ATTORNEYS

United States Patent Office 3,304,642
Patented Feb. 21, 1967

3,304,642
LICENSE HOLDING DEVICE
Gilbert W. Dardis, 301 E. 9th St., Spencer, Iowa 51301
Filed Oct. 28, 1963, Ser. No. 319,340
1 Claim. (Cl. 40—209)

License plates are usually secured to auttomobiles by screws, bolts, etc. Each time it is necessary to change the license plates, the screws, bolts, etc., must be removed so the old license plate can be removed and the new license plate installed. The new license is then screwed or bolted to the automobile.

This operation is time consuming and usually requires the usage of a screwdriver, pliers, wrench or the like.

Therefore an object of my invention is to provide a device which enables a person to quickly and easily change license plates.

A further object of my invention is to provide a device which enables a person to change license plates without any special tools.

A further object of my invention is to provide a device which will securely hold a license plate in viewing position.

A further object of my invention is to provide a device which will be free from noise.

A further object of my invention is to provide a device which is ornamental in appearance.

A still further object of my invention is to provide a device which will be economical of manufacture, durable in use and refined in appearance.

FIG. 1 is a perspective view of the device.

FIG. 2 is an enlarged scale perspective view of the device with portions thereof cut away.

FIG. 3 is an elevational view of the device, at a reduced scale, with portions thereof cut away to more fully illustrate the device.

FIG. 4 is a cross-sectional view of the device taken on line 4—4 of FIG. 3.

FIG. 5 is a partial cross-sectional view of the device taken on line 5—5 of FIG. 3, and FIG. 6 is a partial elevational view of the device, at an enlarged scale, illustrating the means for locking the device in a closed position.

I have used the numeral 10 to generally designate the license holding device and the numeral 11 to designate a license plate. The following description will describe the device in the orientation in which it appears in FIG. 1 which would be the normal operation orientation. License holder 10 includes a back-up plate 12 and a cover plate 14. Back-up plate 12 is comprised of a flat member 16 and a flange 18 extending at right angles from said flat member 16 at its perimeter. Flange 18 includes a locking lip 20 located on the outer surface thereof and approximately in the center of the upper flange member. Each of the side flange members of flange 18 has a first hole 22 adjacent their lower end and a second hole 24 located above said first hole. A plurality of holes 26 in flat member 16 provide a means for securing the back-up plate 12 to an automobile. A plurality of resilient strips 28 such as rubber or the like are affixed to flat member 16 adjacent its perimeter by glue or any convenient means to securely hold a license plate 11 in position and prevent its rattling or making noises. Cover plate 14 is comprised of base member 30 designed to furnish a display portion 32 and a flange 34 which extends at a right angle to base member 30 at its perimeter to receive flange 18 of back-up plate 12. Hinge pin 36 extends from and is secured to the inner surface of the side member of flange 34. Hinge pin 36 extends through hole 22 to hingedly secure cover plate 14 to back-up plate 12. The inner surface of the upper flange member of flange 34 is provided with an indentation 35 designed to embrace locking lip 20. A protrusion 37 appears on the outer surface of flange 34 caused by indentation 35 on the opposite side of flange 34. A plurality of resilient strips 38 such as rubber or the like are affixed to the inner surface of base member 30 to tightly hold a license plate 11 in position and eliminate the possibility of any rattling or noise. A tension spring 40 comprised of a coil 42, spring arm 44 and spring arm 46 is positioned between flange members 18 and 34 along their side portions and effectively holds the device in a closed position. Coil 42 embraces hinge pin 36 with spring arm 44 being secured to the inner surface of base member 30 by welding 45 or any convenient means. Spring arm 46 terminates in an arm member 48 which extends at a right angle to spring arm 46 and protrudes through hole 24 in flange 18. The tension of spring 40 yieldably resists opening of the device.

The normal operation of the device is as follows. When changing license plates, the top portion of cover plate 14 is opened downwardly and outwardly from the back-up plate 12 which is secured to a vehicle by means of bolts or the like in holes 26. The license plate is then removed from the device and a new license plate inserted into the device. The device is closed until locking lip 20 is embraced by identation 35. Spring 40 also serves to yieldably resist opening of the device. The strips of resilient material 28 and 38 which are located on back-up plate 12 and cover plate 14 respectively serve to cushion the license plate and prevent its rattling.

Thus, from the foregoing it is seen that the device will accomplish at least all of its stated objectives.

Some changes may be made in the construction and arrangement of my license holding device without departing from the real spirit and purpose of my invention, and it is my intention to cover by my claim, any modified forms of structure or use of mechanical equivalents which may be reasonably included within their scope.

I claim:
In a license plate holding device,
a back-up plate,
a flange on the perimeter of said back-up plate extending at right angles with respect to the plane of said plate,
a rectangular cover plate having a display opening therein,
a flange on the perimeter of said cover plate and extending at right angles thereto to receive the flange of said back-up plate,
hinge pins pivotally interconnecting said back-up plate and said cover plate,
a coil spring having a coil portion and first and second spring arms extending therefrom, said coil portion embracing one of said hinge pins, one of said spring arms being secured to said cover plate adjacent said flange thereon, the other of said spring arms having a terminal arm portion detachably received by said flange on said back-up plate, said coil spring yieldably resisting the pivotal movement of said cover plate away from said back-up plate,
a resilient means secured to said back-up plate adjacent its perimeter adapted to engage the license plate to prevent the movement thereof.

References Cited by the Examiner
UNITED STATES PATENTS

| 904,101 | 11/1908 | Tingley | 40—205 |
|---|---|---|---|
| 1,501,839 | 7/1924 | Crase | 40—209 |
| 1,573,113 | 2/1926 | Irie | 40—209 X |
| 1,879,906 | 9/1932 | Linstrom | 40—209 |
| 2,073,403 | 3/1937 | Goldberg | 40—209 |
| 2,865,123 | 12/1958 | Glowzinski | 40—209 |

EUGENE R. CAPOZIO, Primary Examiner.
HERBERT F. ROSS, Examiner.